United States Patent
Shnaiwer et al.

(10) Patent No.: US 9,661,503 B2
(45) Date of Patent: May 23, 2017

(54) SPECTRUM-EFFICIENT SECONDARY USERS GROUPING METHOD FOR TWO-TIER COGNITIVE RADIO NETWORKS

(71) Applicant: KING FAHD UNIVERSITY OF PETROLEUM AND MINERALS, Dhahran (SA)

(72) Inventors: Yousef Naief Shnaiwer, Dhahran (SA); Salam Adel Zummo, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 97 days.

(21) Appl. No.: 14/712,872

(22) Filed: May 14, 2015

(65) Prior Publication Data

US 2016/0338030 A1    Nov. 17, 2016

(51) Int. Cl.
*H04W 4/00* (2009.01)
*H04W 16/14* (2009.01)
*H04W 24/02* (2009.01)
*H04W 72/08* (2009.01)

(52) U.S. Cl.
CPC ........... *H04W 16/14* (2013.01); *H04W 24/02* (2013.01); *H04W 72/082* (2013.01)

(58) Field of Classification Search
CPC .............................. H04W 16/14; H04W 84/045
See application file for complete search history.

(56) References Cited

U.S. PATENT DOCUMENTS

| | | | | |
|---|---|---|---|---|
| 2012/0120887 A1* | 5/2012 | Deaton | ................. | H04W 16/14 370/329 |
| 2013/0072205 A1* | 3/2013 | Wang | .................... | H04L 1/0019 455/450 |
| 2014/0080535 A1 | 3/2014 | Gauvreau et al. | | |
| 2014/0162585 A1 | 6/2014 | Bose et al. | | |
| 2014/0171018 A1 | 6/2014 | Elrefaey et al. | | |
| 2014/0274053 A1* | 9/2014 | Latva-Aho | ............ | H04W 36/30 455/436 |

* cited by examiner

*Primary Examiner* — Kevin C Harper
(74) *Attorney, Agent, or Firm* — Richard C. Litman

(57) ABSTRACT

The spectrum-efficient secondary users grouping method for two-tier cognitive radio groups femtocell base stations (FBSs) and macrocell secondary users (MSUs) into non-interfering groups based on their GPS location information, and then serves the FBSs/MSUs within each group using the same channel. A first approach for grouping the secondary users (SUs) is distance-based. A second approach utilizes profit maximization. Both approaches are extended to a co-channel deployment scenario where the FBSs can share part of the channels purchased for the MSUs to further reduce the number of channels to be purchased from the PU networks. The distance-based grouping method finds the minimum number of groups such that the desired quality of service (QoS) determined by an outage probability threshold is maintained. The profit maximization method tries to find the set of SUs that maximizes the expected total profit of the SU network.

12 Claims, 9 Drawing Sheets

SPECTRUM-EFFICIENT SECONDARY USERS GROUPING METHOD FOR TWO-TIER COGNITIVE RADIO NETWORKS

BACKGROUND OF THE INVENTION

1. Field of the Invention

The present invention relates to use of orthogonal spectrum bands in cellular networks, and particularly to a spectrum-efficient secondary users grouping method for two-tier cognitive radio networks.

2. Description of the Related Art

The trend in wireless communications industry has been always towards enhancing spectrum efficiency and energy efficiency of system operation. The drive for enhancing energy efficiency is mainly to satisfy the requirements of "green communications" and to extend the battery lifetime of user equipment (UE). On the other hand, the need to promote spectrum efficiency of future communications systems was raised in order to overcome the spectrum scarcity problem, and at the same time, to allow for increasing data rate transmission to satisfy the needs of emerging applications and services Cognitive radio (CR) is a self-organized radio that can sense the spectrum, select the suitable channel to use, transfer from a spectrum band to another band when necessary, and share the spectrum with other radios. Cognitive radio was originally proposed to allow unlicensed secondary users (SUs) to utilize the spectrum allocated to primary users (PUs) when it is idle. Spectrum trading, defined as the process of selling and buying spectrum between the PUs and the SUs, is employed by CR networks to serve their SUs. One of the major issues in spectrum trading is pricing, which involves determining the value of the spectrum to the buyer. Since achieving low spectrum price is crucial to the success of the SU network, there is a need for a mechanism that helps the SU network to reduce the amount of spectrum to be purchased from the PU networks.

Thus, a spectrum-efficient secondary users grouping method for two-tier cognitive radio networks solving the aforementioned problems is desired.

SUMMARY OF THE INVENTION

The spectrum-efficient secondary users grouping method for two-tier cognitive radio networks groups femtocell base stations (FBSs) and macrocell secondary users (MSUs) into non-interfering groups based on their GPS location information, and then serves the FBSs/MSUs within each group using the same channel.

A first approach for grouping the secondary users (SUs) is distance-based. A second approach utilizes profit maximization. Both approaches are extended to a co-channel deployment scenario where the FBSs can share part of the channels purchased for the MSUs to further reduce the number of channels to be purchased from the PU networks. The distance-based grouping method finds the minimum number of groups such that the desired quality of service (QoS) determined by an outage probability threshold is maintained. The profit maximization method tries to find the set of SUs that maximizes the expected total profit of the SU network.

These and other features of the present method will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The spectrum-efficient secondary users grouping method for two-tier cognitive radio networks groups femtocell base stations (FBSs) and macrocell secondary users (MSUs) into non-interfering groups based on their GPS location information, and then serves the FBSs/MSUs within each group using the same channel. It should be understood that the present spectrum-efficient secondary users grouping method for two-tier cognitive radio networks may be performed by any suitable computer system, processor or other type of computing device, such as, for example, a personal computer or a programmable logic controller, as is well known in the art.

A first approach for grouping the secondary users (SUs) is distance-based. A second approach utilizes profit maximization. Both approaches are extended to a co-channel deployment scenario where the FBSs can share part of the channels purchased for the MSUs to further reduce the number of channels to be purchased from the primary user (PU) networks. The distance-based grouping method finds the minimum number of groups such that the desired quality of service (QoS) determined by an outage probability threshold is maintained. The profit maximization method tries to find the set of SUs that maximizes the expected total profit of the SU network.

Figure 1:
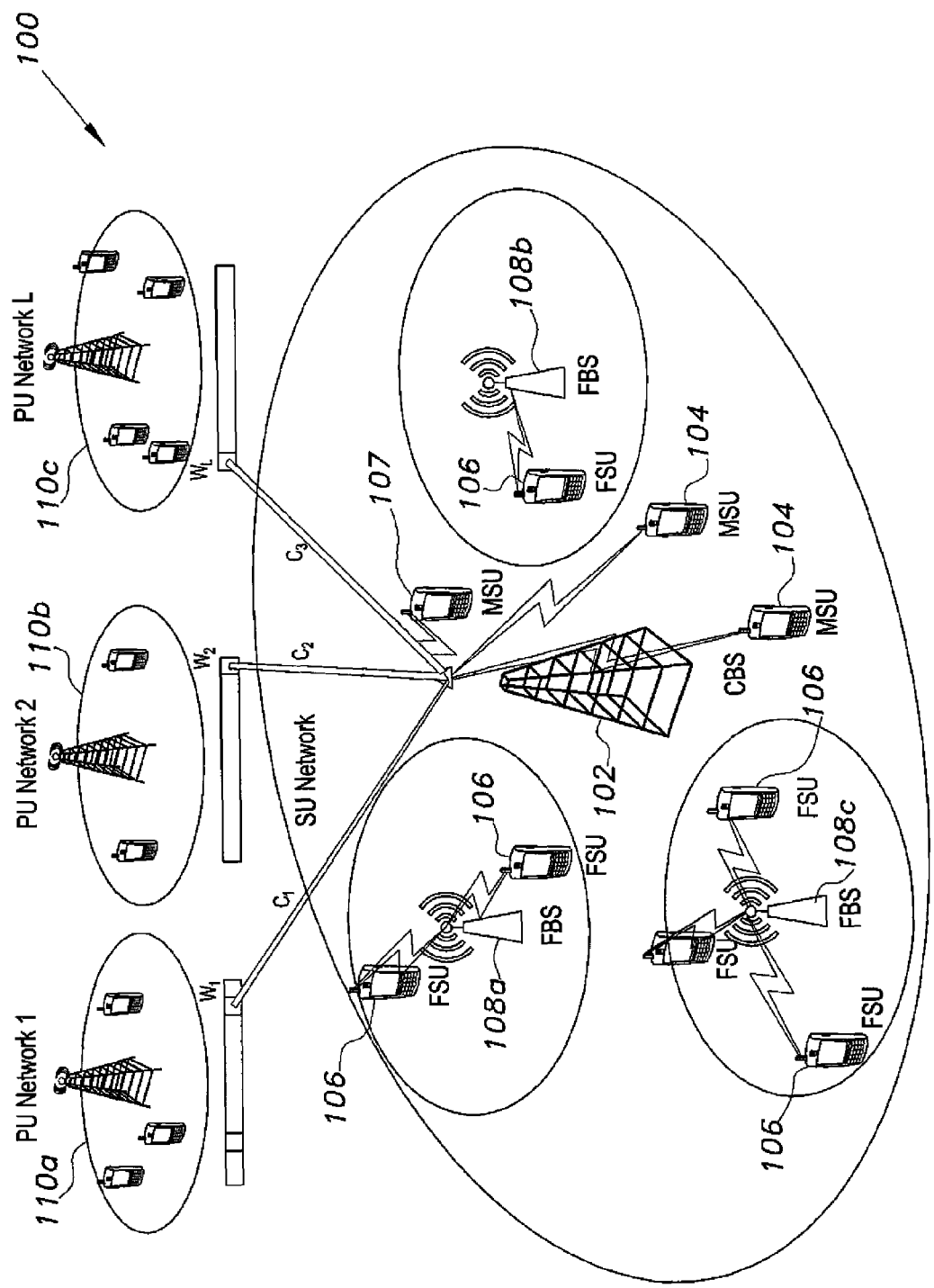
FIG. 1 is a schematic diagram of a system implementing a spectrum-efficient secondary users grouping method for two-tier cognitive radio networks according to the present invention.

The present network model 100 is shown in FIG. 1, where L PU networks (including exemplary networks (110a, 110b, and 110c) offer part of their spectrum $W_l$, $l=1, \ldots, L$ at a price $c_l$ per channel to one SU network. The SU network consists of only one macrocell, so there exists one cognitive base station 102 (CBS) in the secondary network. The CBS 102 is assumed to be serving I MSUs 104 and K FBSs (including, e.g., FBS 108a, FBS 108b, and FBS 108c) in the network, and the $k^{th}$ FBS (where $k=1, \ldots, K$) serves $N_k$ femtocell secondary users (FSUs) 106, which can access the FBS simultaneously. Without loss of generality, it is assumed that the band offered by each PU network can be divided into several channels with the same bandwidth, where each channel satisfies the data rate requirement of a MSU or a FSU if the signal-to-interference ratio (SIR) is above a certain threshold. The FBSs are connected to the CBS 102 using broadband connection (e.g., optical fiber or DSL). The coverage radii of the macrocell and each femtocell are assumed to be circular, centered at the CBS 102 and the FBS, respectively. All the femtocells are assumed to have the same coverage radius. Closed-access is assumed where the femtocell serves only registered users.

Each FBS sends its position $$\{G_{k_l}\}_{k=1}^K$$

(determined using a built-in GPS receiver) and the number of users it serves to the CBS 102 through the wired backhaul. The CBS 102 performs grouping of FBSs and adds MSUs 104 to the groups of FBSs 108a, 108b, 108c based on the location information in order to satisfy a certain objective. Then, the CBS 102 purchases a number of channels equal to the number of groups. The offers from each PU network (110a, 110b, 110c) may differ from time to time, depending on the PU network load. This requires the PU networks and the SU network to be perfectly synchronized. The assignment of channels to different MSUs or FBS groups can be performed by the CBS 102 randomly or according to their spectrum efficiencies to maximize the CBS profit. The channels purchased from different PU networks or from the same PU network are assumed to be perfectly orthogonal.

Focusing on the uplink signal at an arbitrary BS, it is assumed that the uplink channels of the desired and the interfering SUs suffer from path loss and both large-scale (shadowing) and small-scale (multipath) fading. Under this model, the received signal power at an arbitrary BS from its served SU can be expressed as:

$$P_d^{(R)}=P_d^{(T)}r_d^{-n}\zeta, \quad (1)$$

where $P_d^{(T)}$ is the transmit power of the desired SU, $r_d$ is the distance from the SU to its serving BS, n is the path loss exponent, and $\zeta$ is a random variable (r.v.) modelling the composite fading of the uplink channel experienced by the desired SU signal. Similarly, the received signal power from the $i^{th}$ interfering SU to the desired BS can be expressed as:

$$P_i^{(R)}=P_i^{(T)}L_iT_i^{-n}\chi_i, \quad (2)$$

where $P_i^{(T)}$ is the transmit power of the $i^{th}$ interfering SU, $L_i$ is the penetration loss due to the obstacles between the $i^{th}$ interfering SU and the desired BS, $r_i$ is the distance between the $i^{th}$ interfering SU and the desired BS, and $\chi_i$ is a r.v. modelling the composite fading of the uplink channel experienced by the $i^{th}$ interfering SU signal. Note that SU is used to denote FSUs or MSUs, and BS is used to denote the FBS for FSUs and the CBS for MSUs.

Due to the simultaneous effect of both multipath fading and shadowing, low-mobility users in urban areas experience composite fading. Composite fading channels have been usually modelled by log-normal shadowing and Nakagami multipath fading (gamma distributed power). However, recently, the gamma-gamma (also called the generalized-K) model has started to gain more attention due to its tractability and the availability of approximations with high accuracy. Therefore, it is assumed herein that both the shadowing and multipath fading effects are modelled using gamma r.v.'s. Referring to Nakagami's multipath fading model, the instantaneous received power conditioned on the average local power is modeled as a gamma r.v. as follows:

$$p_\gamma(x) = \frac{1}{\Gamma(m_m)}\left(\frac{m_m}{\Omega}\right)^{m_m} x^{m_m-1}\exp\left(-\frac{m_m}{\Omega}x\right), x > 0, m_m > 0.5 \quad (3)$$

where $m_m$ is the multipath fading parameter that quantifies the severity of the multipath fading effect (the larger $m_m$, the less-severe the multipath fading). The average local power varies due to the shadowing effect, which is modeled using a gamma r.v. as:

$$p_\Omega(y) = \frac{1}{\Gamma(m_s)}\left(\frac{m_s}{\Omega_0}\right)^{m_s} y^{m_s-1}\exp\left(-\frac{m_s}{\Omega_0}y\right), y > 0, m_s > 0 \quad (4)$$

where $m_s$ is the shadowing parameter that quantifies the severity of the shadowing effect (the larger $m_s$, the less-severe the shadowing), and $\Omega_0$ is the mean of the average local power received at the desired BS. The transmit power, the penetration loss, and the path loss can be incorporated in the average of the received mean local power of the desired user ($\Omega_{0d}$) and the $i^{th}$ interfering user ($\Omega_{0i}$) as:

$$\Omega_{0d}=P_d^{(TX)}r_d^{-n}, \text{ and } \Omega_{0i}=P_i^{(TX)}L_ir_i^{-n}. \quad (5)$$

The resulting gamma-gamma (generalized-K) distribution of composite fading can be approximated (through matching the first two moments of the gamma-gamma distribution) by a gamma distribution with the following parameters:

$$\kappa = \frac{m_m m_s}{m_m + m_s + 1 - m_m m_s \epsilon}, \theta = \frac{\Omega}{\kappa}, \quad (6)$$

where $\kappa$ and $\theta$ are the scale and the shape parameters of the approximate composite fading r.v., respectively, and $\epsilon$ is the adjustment factor.

In order to reduce the number of channels to be purchased from the PU networks, the CBS needs to group the FBSs into non-interfering groups based on the distances between them. Grouping the FBSs into non-interfering groups requires that the distance from a FSU to a FBS in another femtocell should be found in order to determine whether the FSU is interfering with that femtocell or not. However, since the coverage radius of a femtocell is usually very small (from 10 to 30 meters), the distance from a FSU to a FBS in another femtocell can be well approximated by the distance between the two FBSs. In the following, the distance-based grouping approach is illustrated, and its complexity and the uplink outage probability are analyzed. Next, the distance threshold minimization is implemented based on the worst-case interference assumptions. Finally, the scheme is extended to the co-channel deployment scenario by adding the MSUs to the groups of FBSs.

The distance-based grouping scheme can be implemented as follows. At first, each FBS determines its location using its GPS and sends it to the CBS. The CBS finds the distances between the femtocells and stores them. Starting with the first FBS (assuming that the CBS assigns an index for each FBS to distinguish it from the other FBSs, so the first FBS is the one with the smallest index), the CBS assigns that FBS to the first group, and it stores the number of FSUs served by that FBS as the category of the group. The category of the group here is defined as the maximum allowed number of FSUs per one FBS member, which corresponds to the number of channels needed to be assigned to that group. The second FBS is then examined by the CBS, and if the distance between the second and the first FBSs is larger than a distance threshold $D_{th}$ and the number of FSUs served by the second FBS is less than or equal to the category of the group, then the CBS assigns the second FBS to the first group. Otherwise, if any of the previously described conditions is not satisfied, then the second FBS is not grouped, and the CBS examines the third FBS and so on. When all the FBSs are examined, the CBS restarts from the first ungrouped FBS and assigns it to the second group. Each time, the CBS checks all the ungrouped FBSs to examine whether they can be assigned to a certain group or not. This process is repeated until all the FBSs are grouped, where a FBS is assigned to a group if its distance to all the members of that group is larger than $D_{th}$ and the number of FSUs it serves is less than or equal to the category of the group.

If a new FSU appears in one of the existing femtocells, its FBS reports to the CBS that it has a new FSU. The CBS checks whether the FBS still satisfies the category condition, and if not, then the CBS increases the category of the group by one and purchases a new channel for it. Further, if a new FBS with an arbitrary number of FSUs appears in the network, it sends its location and the number of its FSUs to the CBS, which, in turn, groups the new FBS according to the algorithm described above.

It is important to point out that grouping the FBSs is one approach to implementing the distance-based grouping scheme. Another way to perform distance-based grouping is to group the FSUs based on the distances between them. However, when the number of FSUs in the network is large, which is expected in dense FBS deployment environments, the complexity of FSU grouping becomes significantly high. Thus, grouping the FBSs serves as a less-complex implementation of the distance-based grouping scheme, since the number of FBSs is usually much smaller than the number of FSUs with very similar performance. The first step in the distance-based grouping scheme is to assign the first ungrouped FBS to a group, and all the other ungrouped FBSs are examined by the CBS to check whether they can be assigned to the group or not. If a FBS is assigned to a group (i.e., it satisfies the distance threshold and the category conditions), it will not be examined for the subsequent groups. The worst-case complexity occurs when each FBS is assigned to a separate group. In this case, each FBS is examined with all the FBSs with an index higher than its index. Assuming that K FBSs exist in the network, then the CBS needs, at most, K−1 operations for the first group, K−2 operations for the second group, and so on. An operation here is defined as the processes required to examine whether a FBS can be assigned to a certain group or not. This includes finding the distance between this FBS and all FBSs assigned to the group, comparing this distance to $D_{th}$, comparing the number of FSUs served by the FBS with the category of the group, and all the accompanying assignment and counting operations. For K FBSs, the CBS needs, at most:

$$\sum_{i=1}^{K}(K-i) = \frac{1}{2}K(K-1)$$

operations. So, the complexity of the distance-based grouping scheme is on the order of $O(K^2)$.

The complexity of the update process is defined as the average number of groups to be examined before finding a suitable group for the new FBS (denoted as the $(K+1)^{th}$ FBS), given that S groups have been already formed by the grouping scheme with $M_s$ (s=1, ..., S) FBS members per each group. The new FBS will be assigned to Group s if it satisfies the distance threshold condition:

$$\left\{ D_{(K+1)j} \right\}_{j=1}^{M_S} \geq D_{th},$$

where D(K+1)j is the distance from the $(K+1)^{th}$ FBS to the $j^{th}$ FBS member in Group s, and the category condition $N_k \leq C_s$. The category of each group (C) is determined by the number of FSUs in the first femtocell member of that group.

To find the average number of groups to be examined before a suitable group is found, let z=1, ..., S be a r.v. representing the number of groups to be examined before finding the group that satisfies the distance threshold condition:

$$\left( \left\{ D_{(K+1)j} \right\}_{j=1}^{M_S} \geq D_{th} \right)$$

and the category condition $N_{K+1} \leq C_s$. The probability that one group is examined is the probability that the first group satisfies the two conditions:

(i.e., $Pr\{z=1\} = \Pi_{i=1}^{M_1} Pr\{D_{i(K+1)} \geq D_{th}\} \times Pr\{N_{(K+1)} \leq C_1\}$).

In the same way, the probability that two groups are examined is the probability that the first group fails to satisfy the condition and the second group satisfies it, i.e.,:

$$Pr\{z=2\} = [1 - (\Pi_{i=1}^{M_1} Pr\{D_{i(K+1)} \geq D_{th}\}) Pr\{N_{(K+1)} \leq C_1\}] (\Pi_{i=1}^{M_2} Pr\{D_{i(K+1)} \geq D_{th}\}) \times Pr\{N_{(K+1)} \leq C_2\}) \quad (7)$$

Generally, the probability that s groups are examined can be written as:

$$Pr\{z=s\} = \prod_{i=1}^{s-1} \left[ 1 - \left( \prod_{j=1}^{M_i} Pr\{D_{j(K+1)} \geq D_{th}\} \right) Pr\{N_{(K+1)} \leq C_i\} \right] \times \quad (8)$$

-continued $$\left(\prod_{v=1}^{M_s} Pr\{D_{v(K+1)} \geq D_{th}\}\right) Pr\{N_{(K+1)} \leq C_s\}\right)$$

Note that the event {z=S} may occur in two cases. The first case is when the last group satisfies the condition, and the second case is when no group can satisfy the condition (i.e., when the FBS is assigned to a new group). Based on the aforementioned discussion, the average number of examined groups before a suitable group is found (z) can be written as:

$$\bar{z} = \sum_{s=1}^{S} s \prod_{i=1}^{s-1} \left[1 - \prod_{j=1}^{M_i} [Pr\{D_{j(K+1)} \geq D_{th}\} Pr\{N_{(K+1)} \leq C_i\}]\right] \times \qquad (9)$$

$$\prod_{v=1}^{M_s} [Pr\{D_{v(K+1)} \geq D_{th}\} Pr\{N_{(K+1)} \leq C_s\}] +$$

$$S \prod_{a=1}^{S} \left[1 - \prod_{n=1}^{M_a} [Pr\{D_{n(K+1)} \geq D_{th}\} Pr\{N_{(K+1)} \leq C_n\}]\right].$$

The expression in (9) depends on the probability that the distance between two FBSs is larger than $D_{th}$. When the FBSs are distributed using Poisson point process (PPP), their locations will be uniformly and independently distributed in the macrocell region. In this case, the probability that the distance between two FBSs inside the circular range of the macrocell (with radius $R_M$) is smaller than $D_{th}$ can be written as:

$$Pr\{D \leq D_{th}\} = \qquad (10)$$

$$1 + \frac{2}{\pi}\left(\frac{D_{th}^2}{R_M^2} - 1\right)\cos^{-1}\left(\frac{D_{th}}{2R_M}\right) - \frac{D_{th}}{\pi R_M}\left(1 + \frac{D_{th}^2}{2R_M^2}\right)\sqrt{1 - \frac{D_{th}^2}{4R_M^2}}$$

Hence, the probability that two FBSs are at a distance of at least $D_{th}$ is just the complement of the probability in (10). However, given that the coverage radii of two femtocells do not overlap with each other (this condition is put to ensure that a FSU served by a FBS is not in the range of another FBS belonging to the same group to avoid severe interference among group members); that is, the distance between two FBSs should be greater than or equal to double the radius of the FBS (denoted by $R_F$), the probability that two FBSs inside the circular range of the macrocell are at a distance of at least $D_{th}$ can be expressed as:

$$Pr\{D \geq D_{th} | D \geq 2R_F\} = \frac{Pr\{D \geq D_{th}, D \geq 2R_F\}}{Pr\{D \geq 2R_F\}} = \frac{Pr\{D \geq D_{th}\}}{Pr\{D \geq 2R_F\}} = \qquad (11)$$

$$\frac{\frac{D_{th}}{\pi R_M}\left(1 + \frac{D_{th}^2}{2R_M^2}\right)\sqrt{1 - \frac{D_{th}^2}{4R_M^2}} - \frac{2}{\pi}\left(\frac{D_{th}^2}{R_M^2} - 1\right)\cos^{-1}\left(\frac{D_{th}}{2R_M}\right)}{\frac{2R_F}{\pi R_M}\left(1 + \frac{2R_F^2}{R_M^2}\right)\sqrt{1 - \frac{R_F^2}{R_M^2}} - \frac{2}{\pi}\left(\frac{4R_F^2}{R_M^2} - 1\right)\cos^{-1}\left(\frac{R_F}{R_M}\right)}.$$

In addition to the distance distribution, a model is needed for the number of FSUs per femtocell. Assuming that the number of FSUs in a femtocell can be modeled as a Poisson r.v. with parameter $\lambda$ representing the average number of FSUs per femtocell, the probability that the number of FSUs in a femtocell is smaller than or equal to some value is just the cumulative distribution function (cdf) of the Poisson r.v., which can be approximated using the cdf of the non-central Chi-square ($\chi^2$) r.v. (with a non-centrality parameter of $2\lambda$ and $2(m+1)$ degrees of freedom) as follows:

$$Pr\{N \leq m\} = 1 - F_{\chi^2}(2\lambda, 2(m+1)), \; m \text{ is integer} \qquad (12)$$

However, since there is a maximum number of users ($N_{max}$) that can be served by a FBS, which depends on the architecture of the FBS itself, equation (12) should be modified to consider this condition as follows:

$$Pr\{N \leq m | N \geq N_{max}\} = \frac{Pr\{N \leq m\}}{Pr\{N \leq N_{max}\}} = \frac{1 - F_{\chi}^2(2\lambda, 2(m+1))}{1 - F_{\chi}^2(2\lambda, 2(N_{max}+1))}, \qquad (13)$$

$m$ is integer

Since the expressions in (11) and (13) do not depend on the location of the FBS and its number of served FSUs, the expression in (9) simplifies as:

$$\bar{z} = \sum_{s=1}^{S} s \prod_{i=1}^{s-1} (1 - \qquad (14)$$

$$[Pr\{D \geq D_{th} | D \geq 2R_F\} Pr\{Pr\{N \leq C_s | N \leq N_{max}\}]^{M_i}) \times$$

$$[Pr\{D \geq D_{th} | D \geq 2R_F\} Pr\{N \leq C_s | N \leq N_{max}\}]^{M_s} +$$

$$S \prod_{a=1}^{S} (1 - [Pr\{D \geq D_{th} | D \geq 2R_F\} Pr\{N \leq C_s | N \leq N_{max}\}]^{M_a})$$

After assigning the $k^{th}$ FBS to Group s, one of the channels reserved for this group is utilized by one of the FSUs served by that FBS. Therefore, the outage event at the FBS can be defined as the probability that the uplink signal-to-interference ratio (SIR) at the FBS from the desired FSU using one of the channels assigned to Group s will fall below a certain threshold, given that S groups have been formed by the grouping scheme, with $M_s$ members in Group s, s=1, ..., S. Therefore, in order to find the outage probability, the probability that a FSU is utilizing the channel of Group s should be found. The probability that the FSU served by the $k^{th}$ FBS is utilizing an uplink channel belonging to Group s is the probability that this FBS satisfies the distance threshold condition:

$$\left(\left\{D_{(K+1)j}\right\}_{j=1}^{M_s} \geq D_{th}\right)$$

and the category condition $N_K \leq C_s$, where $C_s$ is the category of Group s).

The probability that the $k^{th}$ FBS is assigned to the first group is the probability that the first group satisfies the two conditions i.e.,:

$$Pr\{s=1\} = p_{k1} = \Pi_{i=1}^{M_1} Pr\{D_{ik} \geq D_{th}\} \times Pr\{N_K \leq C_1\}.$$

In a similar way, the probability that the $k^{th}$ FBS is assigned to the second group is the probability that the first group does not satisfy the two conditions and the second group does so, i.e.,:

$$Pr\{s=2\} = p_{k2} = \left[\left(1 - \prod_{i=1}^{M_1} P_r\{D_{ik} \geq D_{th}\}\right) Pr\{N_K \leq C_1\}\right] \quad (15)$$

$$\left(\prod_{i=1}^{M_2} P_r\{D_{ik} \geq D_{th}\}\right) \times Pr\{N_K \leq C_2\}.$$

The expression of the uplink outage probability averaged over all the possible groups to which the FBS is likely to be assigned can be generalized as:

$$P_{out}^{(k)} = \quad (16)$$

$$\sum_{s=1}^{S} [P_{out|s}^{(k)} \times p_{ks}] = \sum_{s=1}^{S} s \prod_{i=1}^{s-1} [1 - (Pr\{D \geq D_{th}\})^{M_i} Pr\{N_k \leq C_i\}] \times$$

$$(Pr\{D \geq D_{th}\})^{M_s} Pr\{N_k \leq C_s\} \times P_{out|s}^{(k)},$$

where, $p_{ks}$ is the probability that the $k^{th}$ FBS is assigned to Group s, and $P_{out|s}^{(k)}$ is the outage probability, given that the FSU under consideration is utilizing the channel assigned to Group s (depends on the number of the members of Group s, and on their distances from the $k^{th}$ FBS). Hence:

$$P_{out|s}^{(k)} = Pr\left\{\frac{P_k}{\sum_{i \in V_s, i \neq k} P_i} < a\right\}, \quad (17)$$

where $P_k$ and $P_i$ are the received powers from the desired FSU and the $i^{th}$ interfering FSU at the $k^{th}$ desired FBS, respectively, a is the SIR threshold, and $V_s$ is a vector containing the indices of the FBS members of Group s, which correspond to the indices of the interferers, since only one FSU from each femtocell interferes with the FSUs in the other femtocells belonging to the same group.

Figure 2:
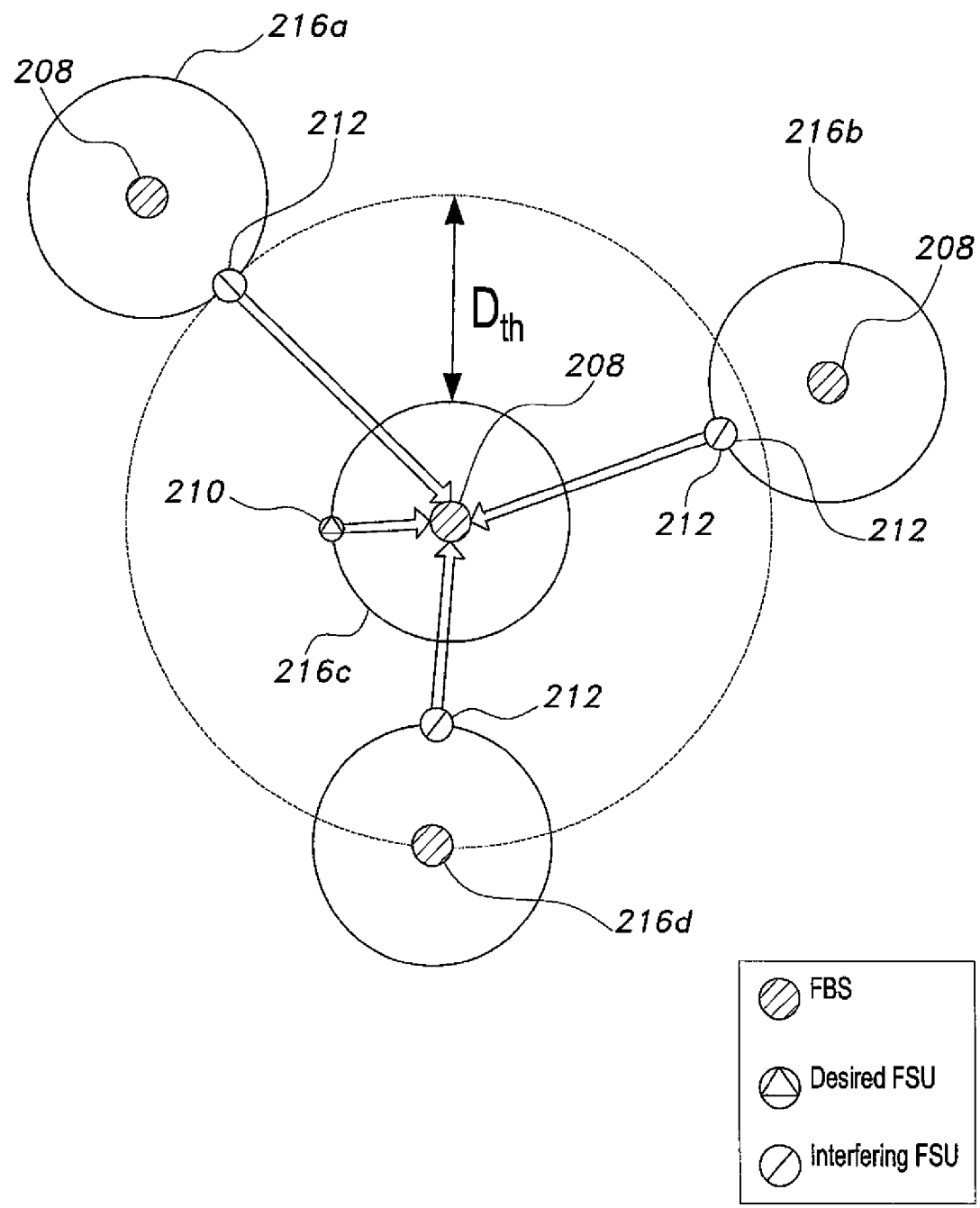
FIG. 2 is a schematic diagram of worst case interference assumptions solved by a spectrum-efficient secondary users grouping method for two-tier cognitive radio networks according to the present invention.

To find $P_{out|s}$, the following worst-case interference assumptions are used to simplify the outage probability expression. An illustration of the worst-case interference assumptions is shown in FIG. 2. First, it is assumed that the FSU 210 served by the desired FBS 208 (in the central femtocell) and all the FSUs served by other FBSs 208 (in the surrounding femtocells 216a, 216b, 216d) belonging to the same group are transmitting at the same time. Second, the interfering FSUs 212 exist at the edge of their respective femtocells towards the desired FBS 208 (central femtocell 216c), and the desired FSU 210 is at the edge of its femtocell (central femtocell 216c). When uplink power control is assumed, placing the FSUs at the edge of their respective femtocells implies that they are using the maximum allowed power to transmit.

Since a gamma distribution is assumed to model composite fading for both the desired and interfering FSUs, it is needed to find the distribution of the ratio of a gamma r.v. to the sum of independent non-identically distributed (i.n.d.) gamma r.v.'s. A derivation of an approximation for the distribution of the ratio of a gamma r.v. to the sum of i.n.d. gamma r.v.'s results in the outage probability as follows:

$$P_{out|s} = \frac{\Gamma(\kappa_d + \kappa_e)}{\Gamma(\kappa_d)\Gamma(\kappa_e)}\left(\frac{\Omega_{0e}}{\Omega_{0d}}\right)^{\kappa_d} a^{\kappa_d} \frac{{}_2F_1\left((\kappa_d), \kappa_d + \kappa_e, 1+\kappa_d, -a\left(\frac{\Omega_{0e}}{\Omega_{0d}}\right)\right)}{\kappa_d}, \quad (18)$$

where ${}_2F_1(.)$ denotes the hypergeometric function, $\kappa_d$ is the shape parameter of the desired FSUs composite fading channel, $\kappa_e$ and $\Omega_{0e}$ are the shape parameter and the average power of the approximate distribution for the sum of i.n.d. gamma r.v.'s given as:

$$\Omega_{0e} = \sum_{\substack{i \in V_s \\ i \neq k}} \Omega_{0i}, \quad \kappa_e \simeq \frac{\left(\sum_{\substack{i \in V_s \\ i \neq k}} \Omega_{0i}\right)^2}{\sum_{\substack{i \in V_s \\ i \neq k}} \frac{\Omega_{0i}^2}{\kappa_i}}. \quad (19)$$

where $\kappa_i$ and $\Omega_{0i}$ are the shape parameter and the average power of the interfering FSUs composite fading channel. Since the distances from the desired FBS to the desired interfering FSUs are incorporated in the mean of the received power, the outage expression is conditioned on the number of members in Group s and their distances from the desired FBS.

It can be directly seen that the smaller the $D_{th}$ used to group the FBSs, the smaller the number of formed groups. This is because as $D_{th}$ becomes smaller, satisfying the distance threshold condition becomes more probable. Since the objective of the CBS is to minimize the number of groups (corresponding the number of channels to be purchased), it follows that the CBS should use the minimum possible $D_{th}$ that satisfies the target QoS.

The uplink outage probability is a monotonically decreasing function of $D_{th}$. The decrease of the uplink outage probability with the increase of $D_{th}$ can be intuitively justified as follows. With the increase of $D_{th}$, the probability that two FBSs are separated by a distance larger than $D_{th}$ becomes lower. Therefore, the number of FBSs per group is expected to decrease with the increase of $D_{th}$. A smaller number of FBSs per group implies a smaller number of interferers on each channel, which, on average, corresponds to a smaller outage probability. Based on this intuition, and assuming that the CBS has some target outage probability to achieve given the desired signal-to-interference ratio (SIR), the present method can make use of the bisection method to find the minimum $D_{th}$ for each group of FBSs as follows.

For the first group, the CBS starts with $D_{th} = 2R_F$ and forms the group. Then, based on the distances between the FBSs, the CBS finds the expected uplink outage probability at each FBS assigned to the group using equation (14). The CBS compares the maximum uplink outage probability with the target one, and if it is smaller, the CBS chooses $R_F$ as $D_{th}$. Otherwise, the CBS increments the value of $D_{th}$ and performs grouping until the maximum uplink outage probability becomes lower than the target one. The CBS fixes the last two values of $D_{th}$ as the desired range. Finally, the CBS applies the bisection method on the desired range to find the optimum value of $D_{th}$ for that group. Once the first group is optimized, this process is repeated again to build the second group, and sequentially until all FBSs are grouped. It should be noticed here that different values of $D_{th}$ may be chosen for different groups.

To further reduce the number of channels to be purchased by the CBS from the PU networks, the groups of FBSs should be allowed to use some of the spectrum allocated to the MSUs. This can be achieved by adding the MSUs to the groups of FBSs. To maintain the QoS of both the MSUs and the FSUs, the CBS should ensure that adding a MSU to a FBS group does not result in an average uplink outage probability for both the FSUs and the MSU that is larger than the outage probability threshold. It should be emphasized here that assigning a MSU to a group means that the channel allocated to that MSU can be shared by all the FBS members of the group (assigned to one FSU per FBS member).

Conventional uplink power control is assumed to be utilized by the MSUs, where the MSU transmits either at a power level enough to compensate for the channel between the MSU and the CBS, or at the maximum allowed power level if it cannot compensate for the channel. That is, the transmit power of the MSU is written as:

$$P_t = \min(P_{max}, P_0/\gamma), \quad (20)$$

where $P_{max}$ is the maximum allowed power for the MSUs, $P_0$ is a design parameter used to set some desired SIR at the base station, and $\gamma$ is the composite fading channel gain modeled as in equation (3).

The scheme is initialized with the groups formed using the distance-based grouping scheme. Then the CBS starts with the first MSU, and it searches for a suitable group and assigns the MSU to that group. A group is considered suitable for a MSU if the resultant outage probability for both the MSU and the FSUs assigned to the group, assuming they are transmitting simultaneously, is less than the target outage probability threshold. A MSU that cannot be assigned to any of the FBS groups is assigned to a separate group with a category equal to one. After grouping the MSUs, the CBS purchases a number of channels equal to the sum of all group categories.

Due to their movements, the MSUs need to be re-grouped by the CBS in order to maintain their QoS. Since the uplink signal is considered, the CBS can find the average uplink SINR of the MSUs by observing the uplink signal received from each MSU over some observation window. The process of re-grouping a MSU is triggered when the average uplink SINR of that MSU goes below some (MSU SINR) threshold level. The MSU is re-grouped using a co-channel deployment extension.

Another case of interest is when a FSU is moving outside the coverage range of its serving femtocell. In this case, the FSU requests service from the CBS as a part of the handover operation, and the CBS tries to find a suitable group for this FSU if any. Otherwise, if no suitable group exists for the FSU, the CBS assigns the FSU to a new group and purchases a channel for it.

The aforementioned strategy was to minimize the number of purchased channels while maintaining a target outage probability. This can serve the situation when the QoS is guaranteed. However, it is not necessary that this strategy will maximize the CBS profit. This is because minimizing the number of purchased channels is achieved by assigning a larger number of FSUs to each group. This will result in a smaller value of the expected SIR for each FSU due to the strong interference, resulting in a lower expected sum rate (profit) for the CBS, where it is assumed that the CBS profit is directly proportional to the sum rate of the FSUs and MSUs. Table 1 presents pseudocode for the distance based grouping.

TABLE 1

Pseudocode for the Distance Based Grouping

| Step Number | Function |
| --- | --- |
| 1 | Initialization: the set of FBSs $\Omega_K = \{1, 2, ..., K\}_K$, the set of FBSs locations $\{G_k\}_{k=1}$, and the set of grouping indices $G = g_1, g_2, ..., g_K$. Each FBS serves $N_k$ users. The category of each Group s is $C_s$ which is set to 0 for all groups |
| 2 | Set s = 1. |
| 3 | repeat |
| 4 | Denote the number of FBSs in Group s by $M_s$, and set $M_s$ to zero. |
| 5 | Find the first FBS (with index k) with grouping index $g_k = 0$, and assign it to Group s. |
| 6 | : Set n = k + 1, $M_s = M_s + 1$, and $C_s = N_k$. |
| 7 | repeat |
| 8 | if $g_n == 0$ then |
| 9 | Find the distance between the $n^{th}$ FBS and all the FBSs in Group s, $\{D_{ni}\}^{M_s}$; |
| 10 | if $\{Dni\}Ms \geq$ Dth then |
| 11 | if $N \leq C_s$ then |
| 12 | Assign FBS n to Group s, |
| 13 | Set $M_s = M_s + 1$, and $g_n = 1$ |
| 14 | end if |
| 15 | end if |
| 16 | end if |
| 17 | Set n = n + 1. |
| 18 | until n = K + 1, end repeat. |
| 19 | Set s = s + 1. |
| 20 | until all elements in G equal 1, end repeat. |
| 21 | Output the number of groups, and the members of each group. |

The profit-maximizing grouping approach is first presented for the orthogonal channel deployment case, where the channels allocated for the FBSs are orthogonal to those allocated for the MSUs. Then, the scheme is extended to the co-channel deployment scenario by adding the MSUs to the groups of FSUs. To maximize the total profit of the SU network, the CBS needs to group the FBSs and re-use the channels such that the expected sum profit is maximized on each channel. We utilize the quadratic utility function to quantify the profit of the CBS, but with simplifications. For example, the CBS cannot switch among the channels offered by different PU networks. This assumption is used to simplify the utility function by excluding the term that corresponds to risk aversion (by setting the substitutability parameter to zero[5]), since the focus here is on the spectrum allocation problem. It is assumed here that the spectrum offered by different PU networks has the same price per channel (assuming that a collusion with price fixing is established and maintained by the PU networks). Each purchased channel may be utilized by several FSUs simultaneously. Based on these simplifications, the profit of the CBS on the channel assigned to Group s, can be characterized by the relation:

$$\Pi_{CBS|M_s} = \sum_{k=1}^{M_s} w\eta_{ka} c_b - \frac{1}{2} w^2 - cw, \quad (21)$$

where w is the bandwidth of the channel assigned to Groups s (assumed to be fixed for all groups), $c_b$ is the cost paid by a FSU for using the channel, c is the price paid by the CBS for the purchased channel, and $M_s$ is the number of FSUs using the channel assigned to Group s, and $\eta_{ks}$ is the spectrum efficiency of the $k^{th}$ FSU using the channel assigned to Group s. When adaptive modulation is utilized, the spectrum efficiency of MSU/FSU transmission can be obtained as:

$$\eta_{ks} = \log_2(1 + J\gamma_{ks}), \text{ where } J = \frac{1.5}{\ln(0.2/BER^{(t)})}, \quad (22)$$

where $\gamma_{ks}$ is the uplink SINR at the $k^{th}$ FBS when its FSU is utilizing the channel assigned to Group s, and $BER^{(t)}$ is the target bit error rate (BER). Since the bandwidth w is a common factor in equation (21), a normalized version of (21) can be written as:

$$\Pi_{CBS|M_s} = \Sigma_{k=1}^{M_s} \eta_{ks} c_b - \tfrac{1}{2} w - c. \quad (23)$$

Hence, the total CBS profit, summed over all the groups, can be expressed as:

$$\bar{\Pi}_{CBS}^{(total)} = \Sigma_{s=1}^{S} \Sigma_{k=1}^{M_s} (\eta_{ks} c_b) - \tfrac{1}{2} wS - cS, \quad (24)$$

where S is the total number of groups.

The utility function in equation (23) represents the profit of the CBS from one channel. It can be seen from equation (23) that allocating a channel to a small number of FSUs would increase the spectrum efficiency for those FSUs (due to the absence of interference), and hence would increase the CBS revenue from that channel, but more channels should be purchased. On the other hand, if the CBS allocates a channel to many FSUs, the number of purchased channels is reduced, but the revenue gained from each user is lower due to interference, which affects the spectrum efficiency of user transmission. Therefore, the problem that needs to be solved here is to determine how many groups should be formed and how many FSUs should be assigned to each group such that the CBS total expected profit is maximized on the channel allocated to each group, which will result in maximizing the total CBS profit over all the channels. The direct way to solve such a problem is by performing an exhaustive search over all the possible set of FSUs for each group and choosing the set that results in the maximum expected profit for the CBS. However, the complexity of this solution is O(N!), where N is the total number of FSUs in the SU network. For a large number of FSUs, such a solution will be time-consuming, since the complexity of the algorithm increases factorially with the number of FSUs. Instead, we propose the use of the greedy approach, which is a very well-known approach in the context of optimization and resource allocation in femtocell networks to reduce the complexity of the algorithm to $O(N^2)$, which is a polynomial-time complexity.

The present greedy algorithm for profit maximization is implemented as follows. The CBS starts with the first FSU and assigns it to the first group. Then, the CBS finds the expected profit due to assigning the second FSU to the first group and compares it to the profit of the first FSU being the only member in the group. If the first profit is larger, the CBS assigns the second FSU to the first group, and sets its expected profit as the optimum profit, which will be the reference value for the subsequent comparisons. Otherwise, the CBS examines the third FSU and so on, until the last FSU is examined. The process is repeated until all the FSUs are grouped, where a FSU is assigned to a group if the following condition is satisfied:

$$\Pi_{CBS|M_s} = \sum_{k=1}^{M_s} \eta_{ks} c_b - \frac{1}{2} w - c. \quad (25)$$

where $\Pi_{CBS|M}$ is the expected sum profit of the CBS from assigning M FSUs to the group, and:

$$\Pi_{CBS|M-1}^{(max)}$$

is the maximum expected sum profit, given that M−1 FSUs have been already assigned to the group. It is important to point out here that the greedy algorithm does not usually find the global optimal point, but in many cases, it ends up finding a local optimum, rather than getting the global one. A better suboptimal solution can be found by using the N-path greedy solution, where for each group, the CBS finds the optimum set of members starting from each ungrouped FSU. Then it chooses the set that achieves the maximum expected profit. However, this enhancement in profit is attained at the cost of more processing time because the complexity of the N-path solution is $O(N^3)$, since it is just the greedy algorithm repeated N times (for each FSU).

The problem in finding the spectrum efficiency in (19) is that since the CBS still does not have the channels, the SIR cannot be measured before the channel is purchased from the PU network. To overcome this problem, the CBS should try to estimate the SIR under the worst-case scenario described in the previous section. Under composite fading scenario and considering the worst-case interference conditions, the pdf of the SIR is just the pdf of the ratio of a gamma r.v. to the sum of i.n.d. gamma r.v.'s, which can be obtained using a derived approximation and the expected SIR for the approximated pdf is written as:

$$E\{SIR\} = \frac{\Omega_{0d}}{\Omega_{0e}} \frac{\kappa_e}{\kappa_e - 1}, \quad (26)$$

$$\kappa_e > 1,$$

where $\Omega_{0e}$ and $\kappa_e$ are defined as in equation (19). Table 2 presents pseudocode for the profit maximizing based grouping.

TABLE 2

Pseudocode for the Profit Maximizing Based Grouping

| Step Number | Function |
|---|---|
| 1 | Initialization: the set of FBSs $\Omega_K = \{1, 2, ..., K\}_K$, the set of FBSs locations $\{G_k\}_{k=1}$, and the set of grouping indices $G = g_1, g_2, ..., g_K$. Each FBS serves $N_k$ ungrouped users. |
| 2 | Set s = 1. |
| 3 | repeat |
| 4 | Denote the number of FSUs in Group s by $M_s$, and set $M_s$ to zero. |
| 5 | Find the first FBS k with grouping index $g_k = 0$, and assign it to Group s. |
| 6 | Set n = k + 1, $M_s = M_s + 1$, and $N_k = N_k - 1$. |
| 7 | Set Π(max) == ΠC BS N I . C BS |
| 8 | if $N_k == 0$ then |
| 9 | Set $g_k = 0$; |
| 10 | end if. |
| 11 | repeat |
| 12 | if $g_n == 0$ then |
| 13 | Find the distance between the FBS n and all the FBSs in Group s, $\{D_{ni}\}_{i=1}$; |
| 14 | Find the expected profit of the CBS from assigning the FSU served by the FBS n to Group s, $\Pi_{C\ B\ S|M_s+1}$. |
| 15 | if $\Pi_{C\ B\ S|M_s+1} > \Pi_{C\ BS}$ then |
| 16 | Assign FBS n to group s, |

TABLE 2-continued

Pseudocode for the Profit Maximizing Based Grouping

| Step Number | Function |
|---|---|
| 17 | Set $M_s = M_s + 1$, $N_n = N_n - 1$, and $\Pi_{CBS}^{(max)} = \Pi_{CBS|M_s + 1}$. |
| 18 | if $N_n == 0$ then |
| 19 | Set $g_n = 1$; |
| 20 | end if; |
| 21 | end if. |
| 22 | end if. |
| 23 | Set $n = n + 1$. |
| 24 | until $n = K + 1$, end repeat. |
| 25 | Set $s = s + 1$. |
| 26 | until all elements in G equal 1, end repeat. |
| 27 | Output the number of groups, and the members of each group. |

To examine the performance of the scheme under spectrum insufficiency scenarios, a modified version of equation (24) is considered by assuming that the CBS profit will saturate when the number of groups reaches the number of channels offered by the PU networks. Therefore, assuming that the total number of channels offered by the PU networks is fixed at B, the expected total CBS profit can be written as:

$$\Pi_{CBS}^{(total)} = \begin{cases} \sum_{s=1}^{S} \sum_{k=1}^{M_s} \eta_{ks} c_b - \frac{1}{2} wS - cS, & S \leq B; \\ \sum_{s=1}^{B} \sum_{k=1}^{M_s} \eta_{ks} c_b - \frac{1}{2} wB - cB, & S > B \end{cases} \quad (27)$$

When the number of offered channels is insufficient to serve all the groups, the CBS sorts the groups in a descending order according to the sum of spectrum efficiencies of the members of each group and allocates the channels to the first B groups to maximize its profit.

Similar to the distance-based co-channel deployment extension described in above, some of the MSUs can be added to the groups of FSUs, which have been formed using the profit maximization grouping scheme described herein. However, the condition that needs to be satisfied does not depend on the QoS or the outage probability. For each MSU and each group of FSUs, the CBS has two choices: either to purchase two orthogonal channels for the MSU and the group of FSUs, or to add the MSU to the group of FSUs and purchase only one channel. The CBS will add the MSU to the group of FSUs only if sharing the channel will result in a higher expected profit for the CBS than when the MSU is assigned an orthogonal channel. Therefore, the condition to be satisfied in order to assign a MSU to a group of FSUs is:

$$\overline{\Pi}_{Co} \geq \overline{\Pi}_{NI}, \quad (28)$$

where $\overline{\Pi}_{Co}$ is the expected sum profit when one channel is purchased and shared among the MSU and the group of FSUs, and $\overline{\Pi}_{NI}$ is the expected sum profit when two orthogonal channels are purchased (i.e., when there is no interference between the MSU and the group of FSUs). An MSU that is not added to a group of FSUs is assigned to a separate group. After adding some of the MSUs to the groups of FSUs, the CBS purchases the number of channels enough to serve the groups if the offered spectrum is sufficient. If the spectrum is insufficient for serving the groups, then the CBS sorts the groups according to the sum of spectrum efficiencies of their members and assigns the channels to the groups with the highest sums to maximize its profit.

In the simulation described below, the coverage radii of the macrocell and each femtocell are assumed to be 100 m and 20 m, respectively. The other parameters will be mentioned independently for each part. The performance of the distance-based grouping scheme, in terms of the average resulting number of channels to be purchased from the PU networks and the average resultant outage probability, is compared for the cases of no grouping, grouping with orthogonal channel deployment, and grouping with co-channel deployment. The FBSs and the MSUs are distributed using PPP with an average number defined as the network density, and the number of FSUs per femtocell follows a Poisson distribution with parameter $\lambda=2$ FSUs per femtocell and maximum number of four FSUs per femtocell. The FBSs constitute 40% of the total number of MSUs and FBSs in the network. The SIR threshold is fixed at 10 dB, the outage threshold is fixed at $10^{-3}$, and the penetration loss is assumed to be 15 dB. The channels from an interfering FSU to FBS, desired FSU to FBS, interfering FSU to CBS, and MSU to CBS are modeled using a gamma r.v. with shadowing and fading parameters $(m_s, m_m) = [(1, 1), (4.23, 4), (1, 1), (2.5, 4)]$ (shadowing parameter $m_s=1, 2.5, 4.23$ correspond to shadow spread $\sigma_s=7, 5, 4$ dB).

Figure 3:
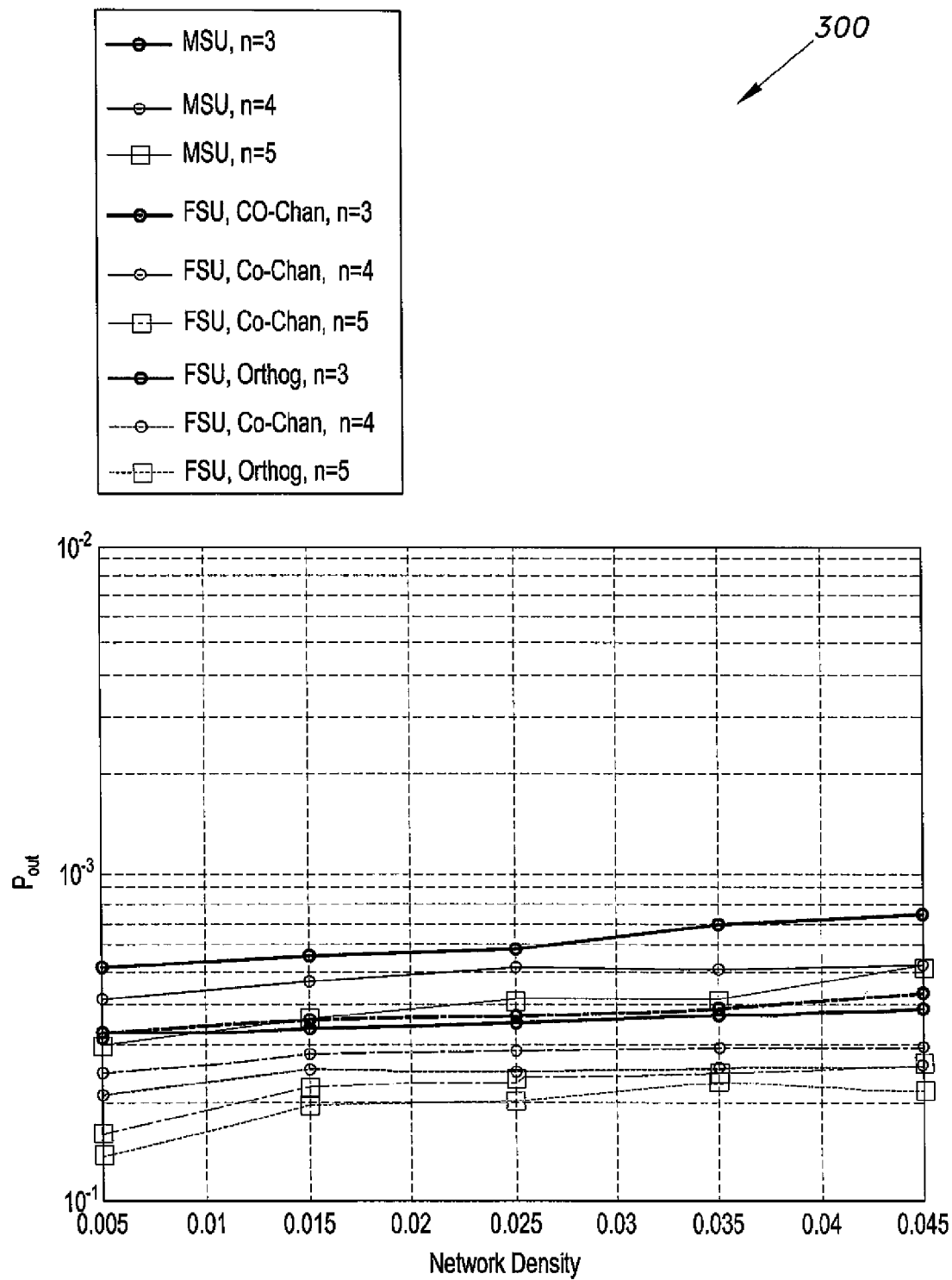
FIG. 3 is a plot showing average uplink outage probability resulting from implementing a spectrum-efficient secondary users grouping method for two-tier cognitive radio networks according to the present invention.

Table 3 shows the average number of channels to be purchased versus the network density for the cases of no grouping, grouping with orthogonal channel deployment, and grouping with co-channel deployment under several interference conditions characterized by the value of the path loss exponent n (the larger is n, the less severe is the interference). The first observation here is the significant reduction in the number of channels to be purchased from the PU networks as a result of applying the grouping scheme when compared to the case of no grouping. The second observation is that the (optimized) grouping scheme can exploit the less severe interference conditions to further reduce the number of groups by grouping at a smaller value of $D_{th}$. The third observation is the reduction in the number of channels to be purchased as a result of applying the co-channel deployment extension, which improves the spectrum efficiency of the scheme. The reduction in the number of channels to be purchased resulting from the co-channel deployment extension is at the cost of worse outage performance for both the FSUs and MSUs. The average MSUs and FSUs uplink outage probabilities versus the network density are shown in plot 300 of FIG. 3 for different values of n. As it can be noticed from plot 300, the scheme with co-channel deployment compromises the QoS of the FSUs and the MSUs to further reduce the number of purchased channels. Since the outdoor environment is usually more severe than the indoor one, which shows in the MSUs uplink outage probability as compared to the FSUs uplink outage probability, the use of the co-channel deployment extension is limited with the QoS requirements of the MSUs.

TABLE 3

The Average Number of Channels to be Purchased from the PU Networks

| | Network density (per meter square) | | | | |
|---|---|---|---|---|---|
| | 0.005 | 0.015 | 0.025 | 0.035 | 0.045 |
| No grouping | 219 | 659 | 1099 | 1538 | 1978 |
| Grouping, Orthogonal, n = 3 | 114 | 341 | 550 | 793 | 1016 |
| Grouping, Co-Chan, n = 3 | 112 | 338 | 546 | 788 | 1012 |

TABLE 3-continued

The Average Number of Channels to be
Purchased from the PU Networks

| | Network density (per meter square) | | | | |
|---|---|---|---|---|---|
| | 0.005 | 0.015 | 0.025 | 0.035 | 0.045 |
| Grouping, Orthogonal, n = 4 | 113 | 325 | 551 | 754 | 973 |
| Grouping, Co-Chan, n = 4 | 110 | 322 | 547 | 749 | 967 |
| Grouping, Orthogonal, n = 5 | 105 | 323 | 529 | 742 | 949 |
| Grouping, Co-Chan, n = 5 | 102 | 320 | 524 | 736 | 941 |

To compare the performance of the CBS profit maximization algorithm to the distance-based grouping scheme, two scenarios are considered, namely, the cases of sufficient and insufficient offered spectrum. For the case of sufficient spectrum, equation (21) is utilized to find the total profit of the CBS. The shadowing parameter of the desired FSU is $m_{sd}$=4.23 (corresponds to a shadow spread of 4 dB) and the multipath fading parameter for the desired FSU is $m_{md}$=2. The shadowing and the multipath fading parameters for each interfering FSU are assumed to be $m_{si}$=2, $m_{mi}$=4, respectively. The penetration loss is fixed at 15 dB, and the target BER is $10^{-6}$. The offered price per channel is c=20, and the cost paid by each FSU to the CBS is $c_b$=1. Only one FSU per FBS is assumed in the simulations. The noise power spectral density is −174 dBm/Hz, and the bandwidth of each channel is 200 KHz. The outage threshold is fixed at $10^{-3}$, and the SIR threshold is fixed at 10 dB.

Figure 4A:
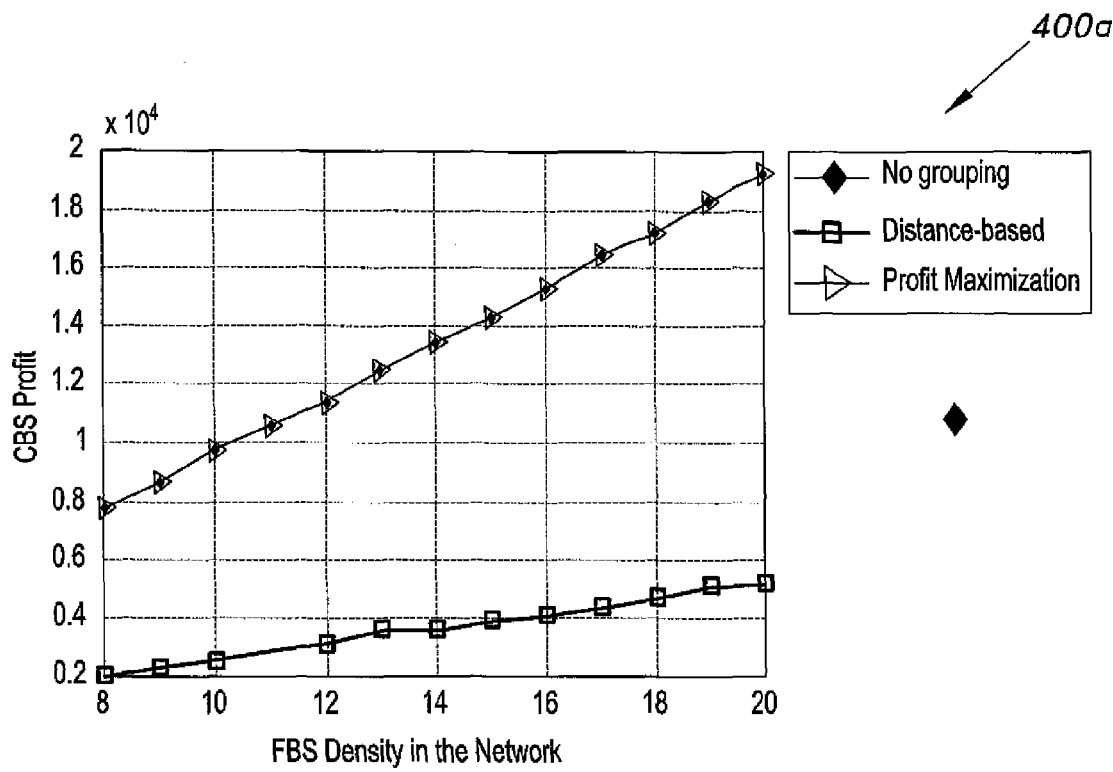
FIGS. 4A, 4B, and 4C are plots comparing expected CBS profit for the cases of no grouping, for an embodiment of a spectrum-efficient secondary users grouping method for two-tier cognitive radio networks according to the present invention using distance-based grouping, and for an embodiment of a spectrum-efficient secondary users grouping method for two-tier cognitive radio networks according to the present invention using profit maximizing based grouping for a sufficient spectrum under three different assumptions for the path loss exponent n in Equation (1) (n=3, n=4, and n=5, respectively).
Figure 4B:
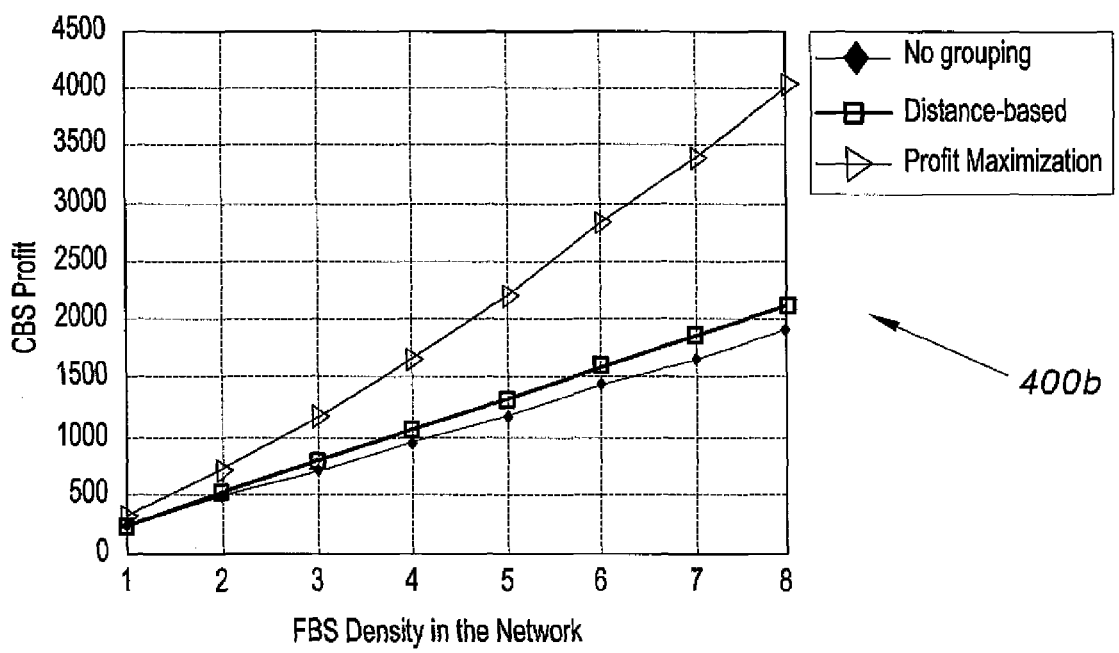
Figure 4C:
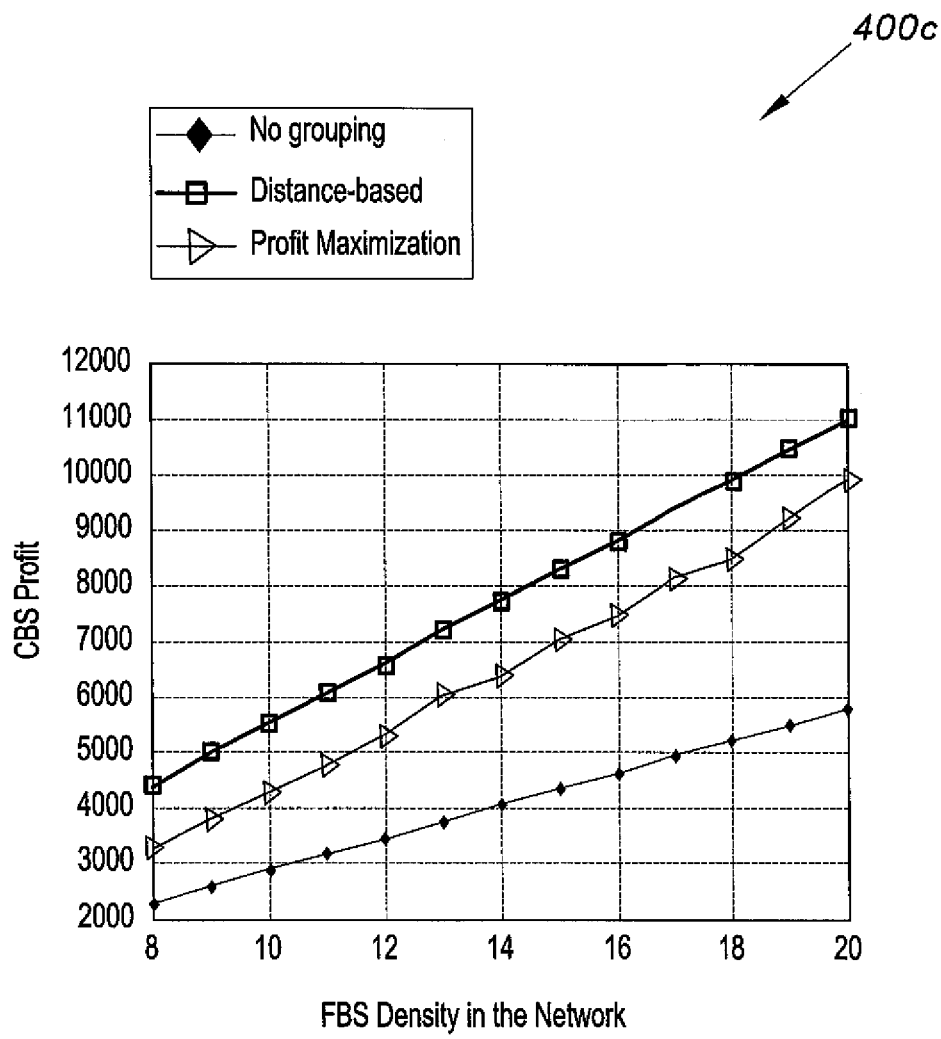

Plots 400a, 400b, and 400c of FIGS. 4A, 4B, and 4C, respectively, show the expected CBS profit, normalized by the channel bandwidth, against the FBS density in the network for n=3, 4, and 5, respectively. For n=3 (implies severe interference conditions and high interference-free spectrum efficiency), the cases of no grouping and grouping using the profit maximization scheme both perform much better than the case of distance-based grouping. This happens because the distance-based grouping scheme is aimed at minimizing the required number of channels while ensuring some minimum required QoS, and it does not observe the CBS profit. In particular, it tries to reduce the number of groups by assigning more members to each group, which, under severe interference conditions, results in a very low profit from each channel. For less severe interference conditions (larger path loss exponent), as shown in FIG. 4B, the distance-based grouping scheme outperforms the case of no grouping in terms of profit, since adding more members does not affect the SIR significantly in this case, but still the profit maximization scheme achieves the best profit. Finally, for n=5, the distance-based grouping scheme outperforms the greedy algorithm because it focuses on reducing the number of groups and the interference effect may almost be ignored in this case.

Figure 5:
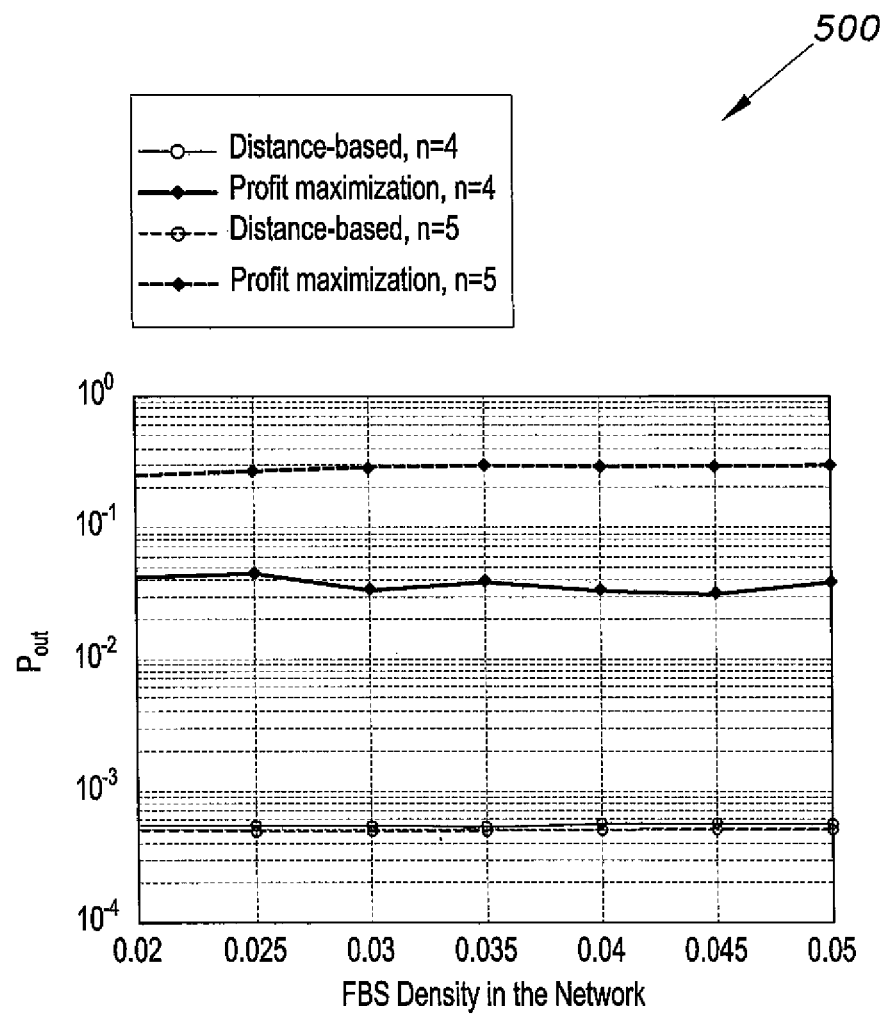
FIG. 5 is a plot showing average outage probability resulting from the distance based grouping and the profit maximizing based grouping embodiments of a spectrum-efficient secondary users grouping method for two-tier cognitive radio networks according to the present invention under two different assumptions for the path loss exponent n in Equation (1) (n=4 and n=5, respectively).
Figure 6A:
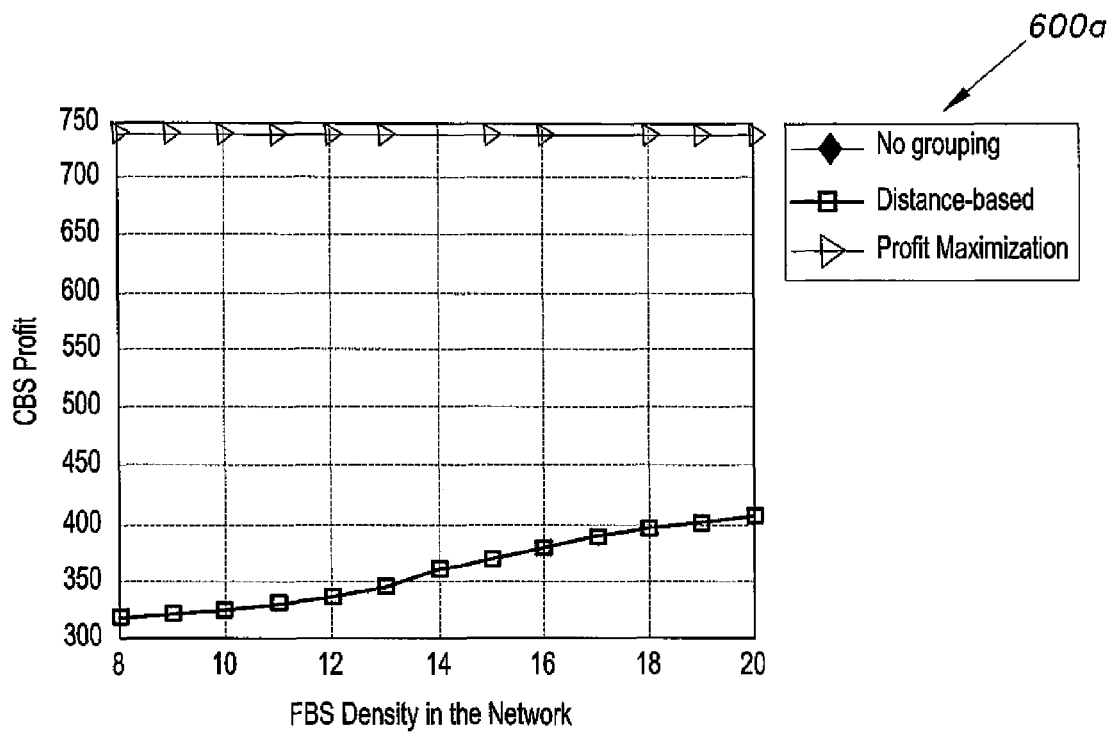
FIGS. 6A, 6B, and 6C are plots comparing expected CBS profit for the cases of no grouping, for an embodiment of a spectrum-efficient secondary users grouping method for two-tier cognitive radio networks according to the present invention using distance-based grouping, and for an embodiment of a spectrum-efficient secondary users grouping method for two-tier cognitive radio networks according to the present invention using profit maximizing based grouping for a limited spectrum under three different assumptions for the path loss exponent n in Equation (1) (n=3, n=4, and n=5, respectively).

In plot 500 of FIG. 5, the uplink outage probability performance of the profit maximization scheme is compared to that of the distance-based scheme, where it can be easily noticed that the distance-based grouping scheme outperforms the profit maximization scheme, which makes it a better candidate for QoS-guaranteed applications. To compare the performance of the CBS profit maximization algorithm to the distance-based grouping scheme under spectrum insufficiency scenarios, equation (27) is utilized to obtain the profit of the CBS where the total number of channels offered by the PU networks is B=100, and the price of each channel is raised to 25. Plot 600a of FIG. 6A shows the normalized CBS profit for n=3, wherein the same can be observed regarding the total CBS profit resulting from the distance-based grouping, as compared to the one resulting from the profit maximization grouping and the no-grouping cases, except for the limit on the profit of both the profit maximization grouping and the no-grouping cases, which is caused by the limited number of channels offered from the PU networks.

Figure 6B:
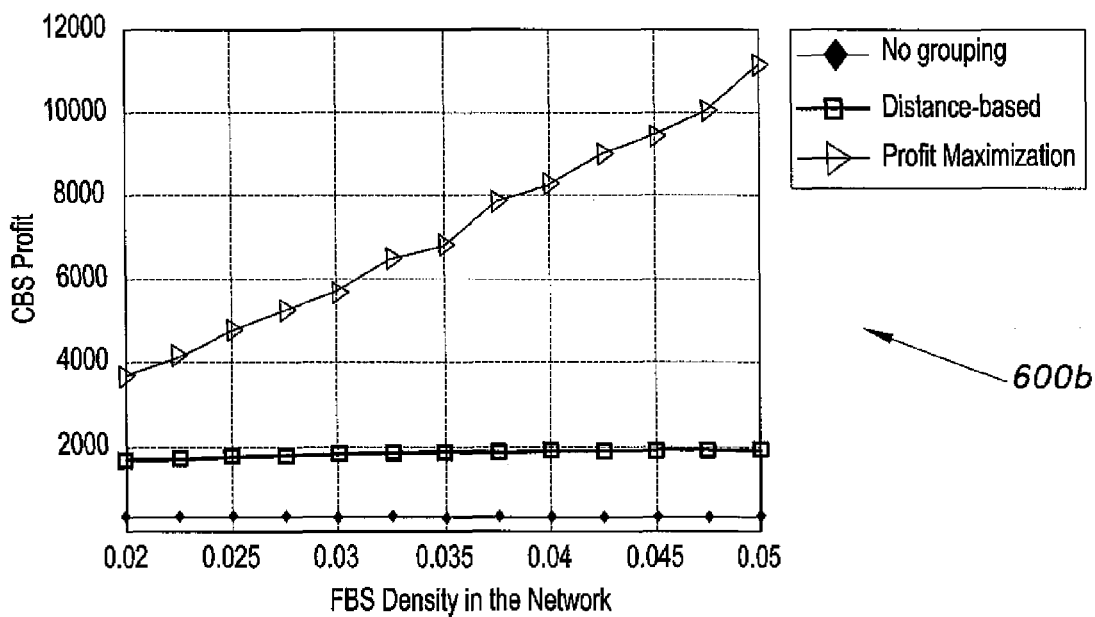
Figure 6C:
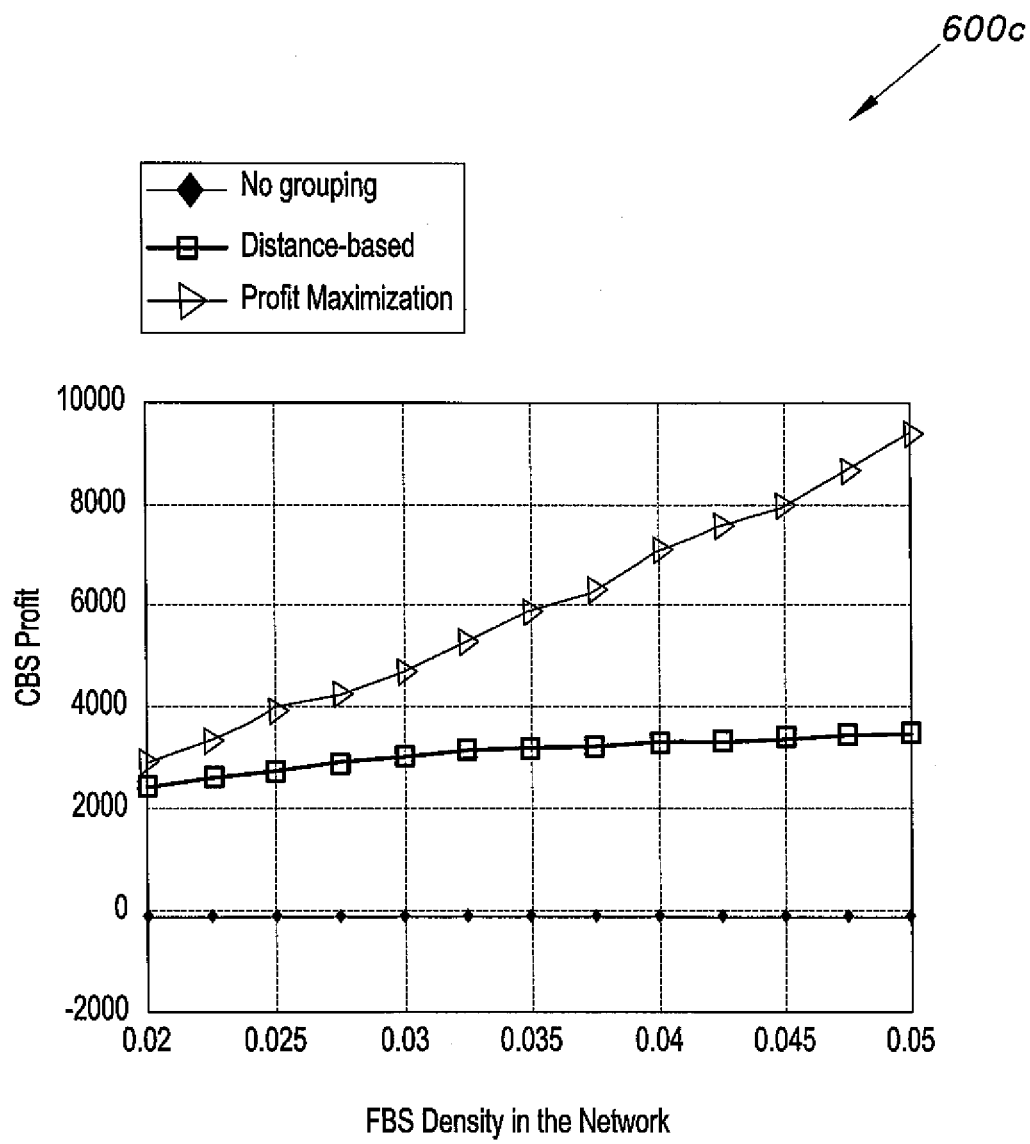

What is really interesting is what can be observed for the cases of n=4 and n=5 (plots 600b and 600c of FIGS. 6B and 6C, respectively). For large values of the path loss exponent, and due to the limit on the number of channels to be purchased, the CBS will get a relatively small profit or it will lose if no grouping scheme is utilized. Furthermore, it can be noticed that the resultant number of groups for the distance-based grouping scheme is larger, which is reflected on the faster saturation of the CBS profit for the distance-based grouping scheme, as compared to the profit maximization scheme.

Figure 7:
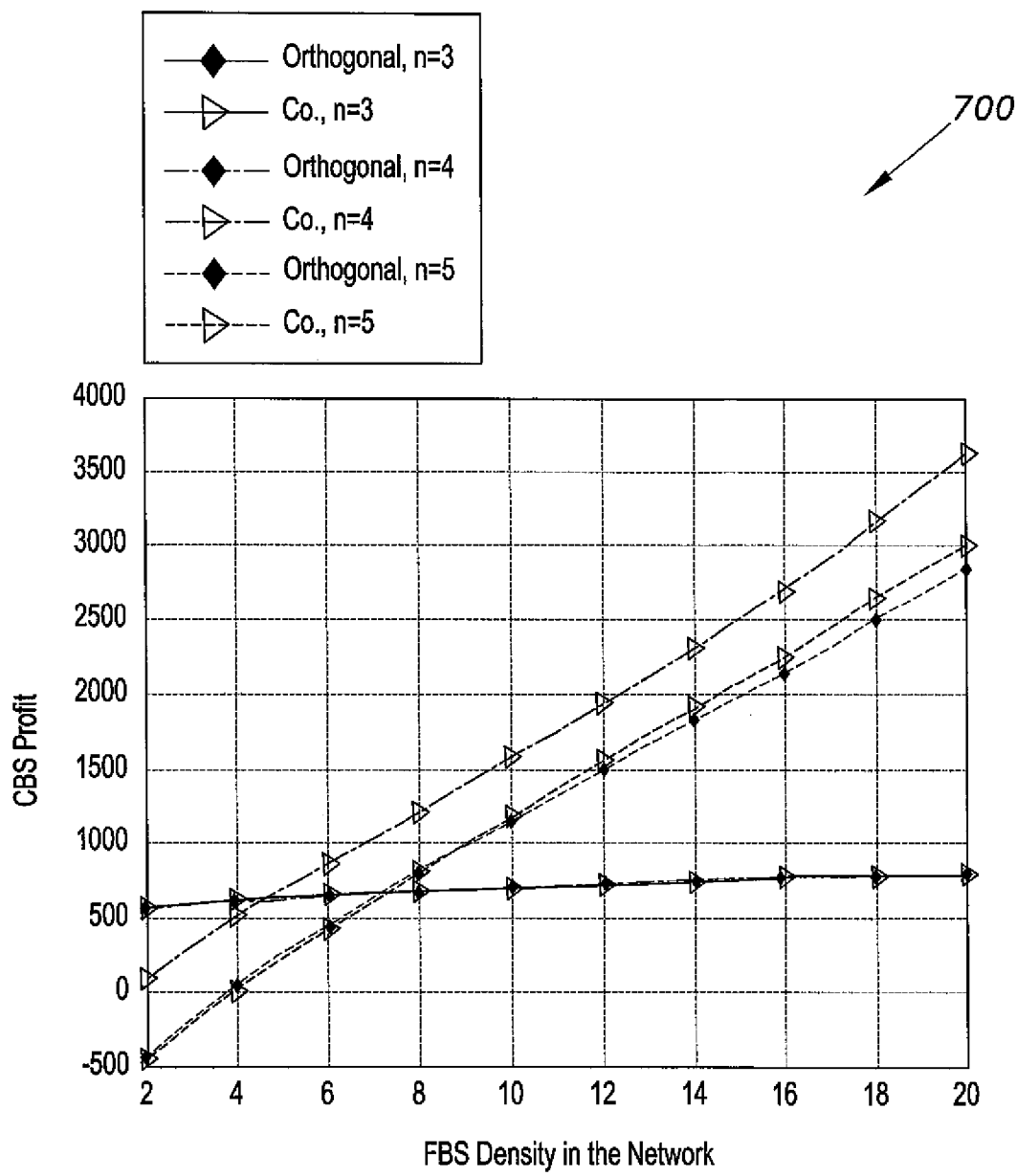
FIG. 7 is a plot showing expected CBS profit for the cases of orthogonal channel deployment and co-channel deployment.

Plot 700 of FIG. 7 shows the CBS profit maximization algorithm with orthogonal channel deployment and co-channel deployment (i.e., when the MSUs are added to the groups of FSUs) for different values of the path loss exponent n. The same set of parameters is used as in the previous figures, except for the existence of the MSUs. The FBSs constitutes 60% of the total number of MSUs and FBSs in the network. It can be noticed that adding the MSUs to the groups of FSUs does not always help to increase the profit of the CBS.

What has been disclosed are two schemes for enhancing spectrum efficiency, and thus reducing spectrum costs for cognitive radio networks, namely, the distance-based and the profit-maximization grouping schemes. The distance-based grouping scheme hinges on grouping the FBSs based on the distances between them into non-interfering groups and purchasing the amount of spectrum sufficient to serve the groups. On the other hand, the profit maximization scheme aims to maximize the profit of the CBS by examining whether adding a SU to a group will increase the total profit or not. The profit maximization scheme shows better performance than the distance-based scheme in terms of achieving higher total profit for the CBS, except for the case of slight interference level under sufficient spectrum scenario, but at the cost of worse uplink outage probability performance. Furthermore, the co-channel deployment extension for the distance-based grouping scheme results in a reduction in the number of channels to be purchased from the PU networks. One the other hand, the co-channel deployment extension of the profit maximization scheme does not always reduce the number of purchased channels.

It is to be understood that the present invention is not limited to the embodiments described above, but encompasses any and all embodiments within the scope of the following claims.

We claim:

1. A spectrum-efficient secondary users grouping method for two-tier cognitive radio networks, comprising the steps of:
grouping femtocell base stations (FBSs) and macrocell secondary users (MSUs) into non-interfering groups based on their location information, the grouping being performed by a cognitive base station (CBS) and being distance-based;
determining an outage probability threshold;
establishing a desired quality of service (QoS);
finding a minimum number of the groups capable of maintaining the desired quality of service; and serving the FBSs/MSUs within each of the groups using a common channel, the common channel being purchased by the CBS.

2. The spectrum-efficient secondary users grouping method according to claim 1, wherein said distance-based grouping further comprises the step of using the distance between an FBS inside a femtocell secondary user's (FSU's) femtocell and an FBS in another femtocell in order to approximate a distance between the FSU and the FBS in the other femtocell.

3. The spectrum-efficient secondary users grouping method according to claim 1, further comprising the step of implementing a distance threshold minimization based on a worst-case interference assumption in the network.

4. The spectrum-efficient secondary users grouping method according to claim 3, further comprising the steps of:
(a) each of the FBSs sending its location to the CBS;
(b) storing distances between the femtocells, the distances being based on the FBS locations sent to the CBS;
(c) assigning a first ungrouped FBS to a group;
(d) storing a number of femtocell secondary users (FSUs) served by the first ungrouped FBS as a category of the group, the category being defined as a maximum allowed number of FSUs per FBS member, thereby corresponding to a number of channels needed to be assigned by the group;
(e) for a subsequent ungrouped FBS, assigning it to the group if the distance between the subsequent ungrouped FBS and the first ungrouped FBS is larger than a distance threshold $D_{th}$ and the number of FSUs served by the subsequent ungrouped FBS is less than or equal to the category of the group; and
(f) repeating steps (c) through (e) for first and subsequent ungrouped FBS until all the FBSs have been grouped.

5. The spectrum-efficient secondary users grouping method according to claim 4, further comprising the step of using a minimum said distance threshold $D_{th}$ satisfying the desired quality of service (QoS).

6. The spectrum-efficient secondary users grouping method according to claim 4, further comprising the steps of:
for each of said groups, first assigning to $D_{th}$ a distance double an FBS radius ($2R_F$);
based on the distances between the FBSs, the CBS finding the expected uplink outage probability at each of the FBSs assigned to the group according to:

$$P_{out}^{(k)} = \sum_{s=1}^{S} [P_{out|s}^{(k)} \times p_{ks}] = \sum_{s=1}^{S} s \prod_{i=1}^{s-1} [1 - (Pr\{D \geq D_{th}\})^{M_i} Pr\{N_k \leq C_i\}] \times (Pr\{D \geq D_{th}\})^{M_s} Pr\{N_k \leq C_s\} \times P_{out|s}^{(k)},$$

where $P_{out}^{(k)}$ is an outage probability given that the FSU under consideration is utilizing the channel assigned to Group s (depends on the number of the members of Group s, and on their distances from the $k^{th}$ FBS), s is a group search range, $D_{th}$ is a distance threshold, D is an actual distance, $N_k$ is the number of users served by FBS k, $C_S$ is the category of group s, $M_s$ is the number of members in group s, $M_i$ is the number of members in group i, $p_{ks}$ is the probability that the $k^{th}$ FBS is assigned to Group s, and $P_{out|s}^{(k)}$ is the outage probability;

the CBS comparing the maximum uplink outage probability with a target maximum uplink outage probability;
the CBS choosing $R_F$ as $D_{th}$ if the maximum uplink outage probability is smaller than the target;
if the maximum uplink outage probability is larger than the target, the CBS incrementing the value of $D_{th}$ while performing grouping until the maximum uplink outage probability becomes lower than the target, the CBS then fixing the last two values of $D_{th}$ as the desired range; and
the CBS applying a bisection method on the desired range to find the optimum value of $D_{th}$ for that group.

7. The spectrum-efficient secondary users grouping method according to claim 6, further comprising the step of adding the MSUs to the groups of FBSs, the groups of FBS being allowed to use some of the spectrum allocated to the MSUs.

8. The spectrum-efficient secondary users grouping method according to claim 7, further comprising the steps of:
assigning the MSUs to suitable groups, the groups being suitable if a resultant outage probability for both the MSU to be assigned and the FSUs assigned to the group is less than the target outage probability threshold; and
purchasing a number of channels equal to the sum of all group categories.

9. The spectrum-efficient secondary users grouping method according to claim 8, further comprising the step of regrouping an MSU when an average uplink signal-to-interference-plus-noise ratio (SINR) of the MSU goes below an MSU SINR threshold level.

10. The spectrum-efficient secondary users grouping method according to claim 8, further comprising the steps of:
the CBS attempting to find a suitable group for an FSU when the FSU is moving outside the coverage range of its serving femtocell; and
if no suitable group exists for the FSU, the CBS assigning the FSU to a new group and purchasing a channel for it.

11. A spectrum-efficient secondary users grouping method for two-tier cognitive radio networks, comprising the steps of:
grouping femtocell base stations (FBSs) and macrocell secondary users (MSUs) into non-interfering groups based on a price paid by a cognitive base station (CBS), the grouping being performed by the CBS;
computing a utility function to quantify the profit of the CBS, the utility function including:

$$\Pi_{CBS|M_s} = \Sigma_{k=1}^{M_s} \eta_{ks} c_b - \tfrac{1}{2} w - c,$$

as a profit of the CBS for one channel, an expression of the total CBS profit summed over all the groups being:

$$\Pi_{CBS}^{(total)} = \Sigma_{s=1}^{S} \Sigma_{k=1}^{M_s} (\eta_{ks} c_b) - \tfrac{1}{2} wS - cS,$$

where S is a total number of groups, $c_b$ is the cost paid by a femtocell secondary user (FSU) for using the channel, c is the price paid by the CBS for the purchased channel, $M_s$ is the number of FSUs using the channel assigned to Group s, w is the bandwidth of the channel assigned to Groups s, and $\eta_{ks}$ is the spectrum efficiency of the $k^{th}$ FSU using the channel assigned to Group s;
re-using the channels based on the quantified profit of the CBS, whereby an expected sum profit is maximized on each of the channels; and serving the FBSs/MSUs within each of the groups using a common channel.

12. A spectrum-efficient secondary users grouping method for two-tier cognitive radio networks, comprising the steps of:
- (a) grouping femtocell base stations (FBSs) and macrocell secondary users (MSUs) into non-interfering groups based on a price paid by a cognitive base station (CBS), the grouping being performed by the CBS;
- (b) the CBS assigning a first femtocell secondary user (FSU) to a first group;
- (c) the CBS finding an expected profit due to assigning a second FSU to the first group;
- (d) the CBS comparing the expected profit to a profit of the first FSU, the first FSU being the only member in the group;
- (e) the CBS assigning the second FSU to the first group if an expected sum profit is larger than the profit of the first FSU, the CBS setting said expected profit as an optimum profit to define a reference value for subsequent profit comparisons;
- (f) if the expected sum profit is smaller than the profit of the first FSU, the CBS examining subsequent FSUs in the same manner as in steps (b), (c), and (d) until a last FSU is examined;
- (g) repeating steps (b) through (f) for all ungrouped FSUs until the ungrouped FSUs are grouped; and
- (h) serving the FBSs/MSUs within each of the groups using a common channel.

* * * * *